United States Patent
Maas et al.

(10) Patent No.: US 8,387,713 B2
(45) Date of Patent: *Mar. 5, 2013

(54) AERATION DEVICE

(75) Inventors: David R. Maas, Owatonna, MN (US); Scott W. Bjorge, Owatonna, MN (US)

(73) Assignee: PlanetAir Turf Products, LLC, Owatonna, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/517,702

(22) Filed: Jun. 14, 2012

(65) Prior Publication Data

US 2012/0255748 A1    Oct. 11, 2012

Related U.S. Application Data

(60) Continuation of application No. 13/251,718, filed on Oct. 3, 2011, now Pat. No. 8,220,557, which is a continuation of application No. 12/685,980, filed on Jan. 12, 2010, now Pat. No. 8,028,758, which is a division of application No. 11/318,728, filed on Dec.

(Continued)

(51) Int. Cl.
  *A01B 45/00* (2006.01)
(52) U.S. Cl. ................................. 172/21; 172/125
(58) Field of Classification Search ............ 172/21, 172/22, 49, 57, 60, 74, 91, 92, 106, 118, 172/123, 125, 545, 546
See application file for complete search history.

(56) References Cited

U.S. PATENT DOCUMENTS

| | | | |
|---|---|---|---|
| 2,041,208 A * | 5/1936 | Rienks | 172/21 |
| 2,302,944 A | 11/1942 | Helbig | |
| 2,347,748 A * | 5/1944 | Melling | 172/21 |
| 3,148,737 A * | 9/1964 | Lunsford | 172/21 |
| 5,036,651 A | 8/1991 | Nelson | |
| 5,142,852 A | 9/1992 | Nelson | |
| 5,183,120 A * | 2/1993 | Watanabe | 172/21 |
| 5,469,922 A * | 11/1995 | Bjorge | 172/22 |
| 5,868,207 A | 2/1999 | Langbakk et al. | |
| 6,241,025 B1 * | 6/2001 | Myers et al. | 172/21 |
| 6,484,811 B1 | 11/2002 | Edwards | |
| 6,513,603 B2 | 2/2003 | Bjorge | |
| 6,543,798 B2 | 4/2003 | Schaffner et al. | |
| 6,659,190 B2 | 12/2003 | Jessen | |
| 6,675,905 B2 | 1/2004 | Hill et al. | |
| 6,684,960 B1 | 2/2004 | Ng et al. | |
| 6,691,791 B2 | 2/2004 | Bjorge | |
| 6,758,283 B2 | 7/2004 | Lauer et al. | |

(Continued)

OTHER PUBLICATIONS

Office Action EP 06-840-344.3, dated May 15, 2009, 5 pages.

(Continued)

*Primary Examiner* — Jamie L McGowan
(74) *Attorney, Agent, or Firm* — Fish & Richardson P.C.

(57) ABSTRACT

A soil aeration device may include a plurality of arcuate blades mounted to an assembly adapted to rotate and translate the blades proximate a ground surface, thereby forming aeration pockets in the soil. In certain embodiments, the arcuate tines penetrate and fracture the soil while minimizing the amount of soil lifted from the pocket deposited on the top of the soil. In various embodiments, a planetary gear assembly imparts to the tine a translational and rotational movement which creates a fractured pocket in the soil while minimizing the amount of soil lifted from the pocket and deposited on the surface of the soil. In still other embodiments, the arcuate tine may have mounted thereon a coring tube that cuts and removes a plug from the pocket formed in the soil.

13 Claims, 14 Drawing Sheets

Related U.S. Application Data 27, 2005, now Pat. No. 7,669,666, which is a continuation-in-part of application No. 10/387,092, filed on Mar. 12, 2003, now Pat. No. 7,096,968, said application No. 11/318,728 is a continuation-in-part of application No. 10/775,998, filed on Feb. 10, 2004, now Pat. No. 6,983,806, which is a continuation of application No. 10/281,786, filed on Oct. 28, 2002, now Pat. No. 6,691,791, which is a division of application No. 09/821,373, filed on Mar. 29, 2001, now Pat. No. 6,513,603.

(60) Provisional application No. 60/363,786, filed on Mar. 12, 2002.

(56) References Cited

U.S. PATENT DOCUMENTS

| | | |
|---|---|---|
| 6,792,704 B2 | 9/2004 | Johnson |
| 6,805,205 B1 | 10/2004 | Gabard |
| 6,983,806 B2 | 1/2006 | Bjorge |
| 7,055,617 B2 | 6/2006 | Bjorge et al. |
| 7,070,005 B2 | 7/2006 | Maas |
| 7,096,968 B2 | 8/2006 | Maas |
| 7,152,691 B2 | 12/2006 | Maas et al. |
| 7,204,317 B2 | 4/2007 | Maas et al. |
| 7,290,619 B2 | 11/2007 | Maas et al. |
| 7,451,831 B2 | 11/2008 | Bjorge et al. |
| 2003/0230417 A1 | 12/2003 | Maas et al. |
| 2005/0173133 A1 | 8/2005 | Maas et al. |
| 2006/0067762 A1 | 3/2006 | Terao et al. |
| 2006/0225899 A1 | 10/2006 | Maas et al. |

OTHER PUBLICATIONS

PlanetAir Aerator, "Aerate, Mow, then Putt in just 15 minutes . . . ", Brochure, PlanetAir Turf Products, LLC—believed to have been publicly available before Aug. 11, 2003.

PlanetAir Aerator, "Aerate. Mow. Play.", Brochure, PlanetAir Turf Products, LLC—believed to have been publicly available before Aug. 11, 2003.

PlanetAir Aerator, "Innovation that improves and protects your piece of the planet . . . ," Brochure, PlanetAir Turf Products, LLC—believed to have been publicly available before Aug. 11, 2003.

\* cited by examiner

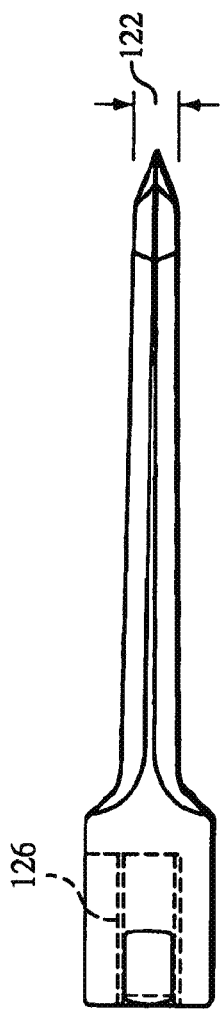
FIG. 13
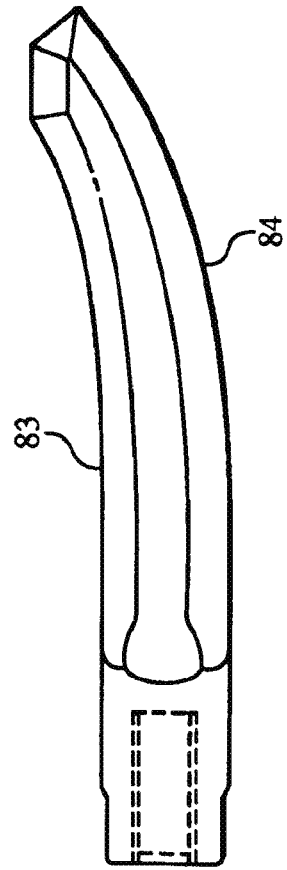
FIG. 15
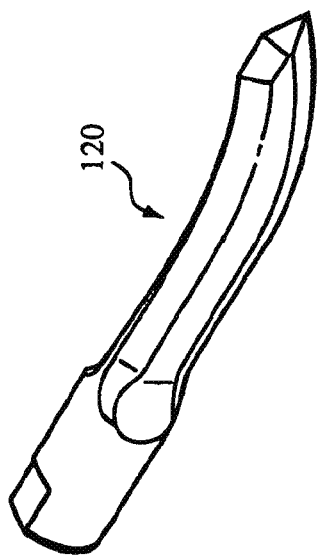
FIG. 12
FIG. 14

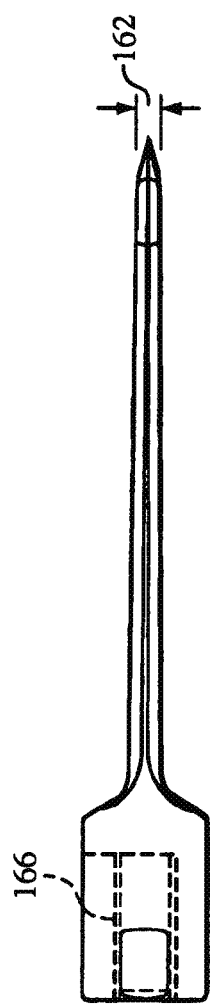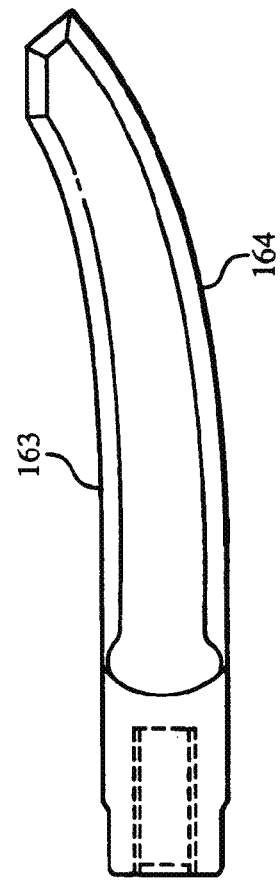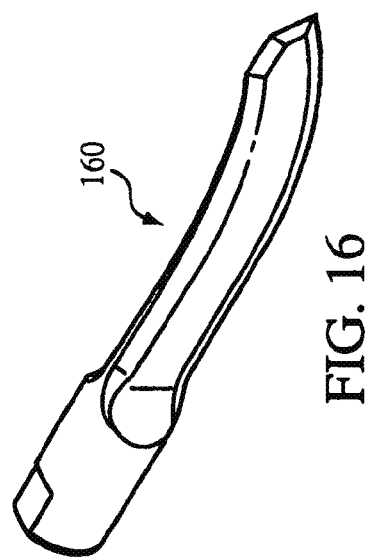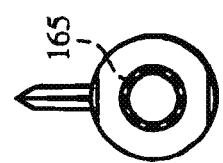
FIG. 17
FIG. 19
FIG. 18
FIG. 16

AERATION DEVICE

CROSS REFERENCE TO RELATED APPLICATIONS

This application is a continuation of U.S. application Ser. No. 13/251,718 entitled "Aeration Device" and filed by David R. Maas et al. on Oct. 3, 2011, which is a continuation of U.S. application Ser. No. 12/685,980 entitled "Aeration Device" and filed by David R. Maas et al. on Jan. 12, 2010, which is a divisional of U.S. application Ser. No. 11/318,728 entitled "Aeration Device" and filed by David R. Maas et al. on Dec. 27, 2005, which (1) is a continuation-in-part of U.S. application Ser. No. 10/387,092 (now U.S. Pat. No. 7,096,968) entitled "Aeration Device" and filed on Mar. 12, 2003, which claims priority to U.S. Provisional Application No. 60/363,786 entitled "Aeration Device" and filed on Mar. 12, 2002, and (2) is also a continuation-in-part of U.S. patent application Ser. No. 10/775,998 (now U.S. Pat. No. 6,983,806) entitled "Aeration Device" and filed on Feb. 10, 2004, which is a continuation of U.S. patent application Ser. No. 10/281,786 (now U.S. Pat. No. 6,691,791) entitled "Soil Aeration Tine" and filed on Oct. 28, 2002, which is a divisional of U.S. patent application Ser. No. 09/821,373 (now U.S. Pat. No. 6,513,603) entitled "Soil Aeration Tine" and filed on Mar. 29, 2001. The entirety of these applications are incorporated herein by reference.

BACKGROUND

Soil aeration devices are generally designed to cut a plug out of the soil instead of driving a spike into the soil because the latter approach compacts the soil. Towable soil aerator devices typically remove plugs of soil while forming an enlarged soil aeration pocket. Such aerators include hollow cylindrical tubes that enter the soil at an angle to cut free a cylindrical soil plug which contains grass, grass roots and soil. As the soil aeration device moves forward, planetary gears in the soil aeration device cause the soil aeration tubes to pivot to form a soil aeration hole or pocket wherein the bottom portion of the soil aeration hole is larger than the top opening of the soil aeration hole. The soil aeration tube is then lifted out of the soil to remove the soil plug, which is usually discarded on top of the soil.

One of the difficulties with soil aeration devices is that a substantial amount of soil, grass and roots in the form of cylindrical plugs are left on top of the soil. These soil plugs must either be removed, allowed to decompose, or pulverized via mowing. Generally, the larger the soil plugs, the longer it takes for the soil plugs to decompose naturally.

SUMMARY

A soil aeration device may include a plurality of arcuate blades mounted to an assembly adapted to rotate and translate the blades proximate a ground surface, thereby forming aeration pockets in the soil. In certain embodiments, the arcuate tines penetrate and fracture the soil while minimizing the amount of soil lifted from the pocket deposited on the top of the soil. In various embodiments, a planetary gear assembly imparts to the tine a translational and rotational movement which creates a fractured pocket in the soil while minimizing the amount of soil lifted from the pocket and deposited on the surface of the soil. In still other embodiments, the arcuate tine may have mounted thereon a coring tube that cuts and removes a plug from the pocket formed in the soil.

The apparatus described herein may provide one or more of the following advantages. In certain embodiments, the soil aeration device enables a grassy area such as a golf course fairway to be aerated without the deposition of the plugs or significant amounts of soil on the grass, thereby permitting use of the fairway immediately after aeration without the need to remove or mow soil plugs or otherwise treat the area. In some embodiments, the translational and rotational movement imparted to an arcuate coring tine minimizes the size of the aperture cut in the soil and the amount of soil lifted from the aeration pocket and deposited on the surface of the ground.

The details of one or more embodiments are set forth in the accompanying drawings and the description below. Other features, objects, and advantages of the invention will be apparent from the description and drawings, and from the claims.

DESCRIPTION OF DRAWINGS

FIG. 12 is a perspective view of yet another embodiment of an aeration tine.

FIG. 13 is a top view of the aeration tine of FIG. 12.

FIG. 14 is an end view of the aeration tine of FIG. 12.

FIG. 15 is a side view of the aeration tine of FIG. 12.

FIG. 16 is a perspective view of an aeration tine adapted for use on putting greens.

FIG. 17 is a top view of the aeration tine of FIG. 16;

FIG. 18 is an end view of the aeration tine of FIG. 16;

FIG. 19 is a side view of the aeration tine of FIG. 16;

Like reference symbols in the various drawings indicate like elements.

DETAILED DESCRIPTION

Figure 1:
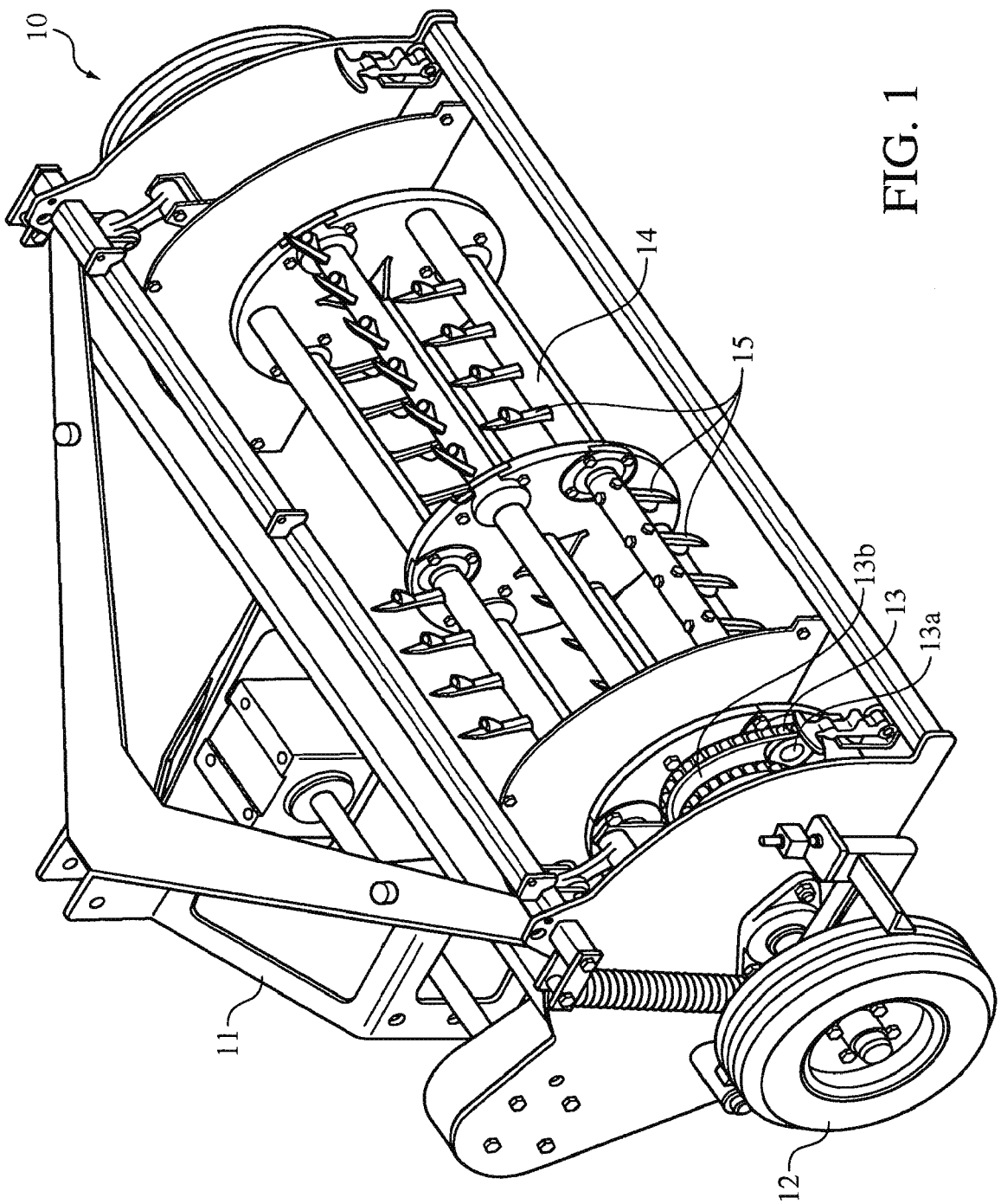
FIG. 1 is a perspective view of a soil aerator device having a set of aeration tines.

FIG. 1 is a perspective view of a pull type soil aeration device 10 having a frame 11 supported by a pair of wheels 12. A gear mechanism 13, which is connected to the power take off shaft of a tractor (not shown), rotates the tine holders 14 which contain a set of soil aeration tines 15. In the embodiment shown the aeration tines are located on parallel members and rotate in an epicycle or planetary manner. A soil aeration device providing planetary motion is more fully described in Bjorge U.S. Pat. No. 5,469,922 titled Soil Aerator issued Nov. 28, 1995 and is incorporated herein by reference.

Figure 2:
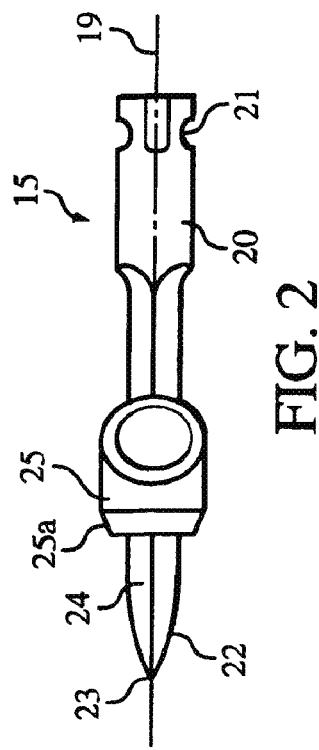
FIG. 2 is a top view of an aeration tine.

FIG. 2 shows a top view of soil aeration tine 15 capable of both fracturing and removing soil. Soil aeration tine 15 comprises an elongated member 20 having a central axis 19. Elongated member 20 has a first section 22 terminating in an apex end 23 and a second section or mounting end 21 for mounting elongated member 20 on a soil aeration device. Mounted to elongated member 20 is a cylindrical soil cutting tube 25 which is positioned rearwardly or aft of apex end 23 so that when apex end 23 of elongated member 20 is axially driven into a patch of soil the apex end 23 of elongated member 20 penetrates the patch of soil before the soil cutting tube 25 engages the soil. As the first section 22 penetrates the soil it fractures the soil to form a partial soil aeration pocket. Next, the soil 20 cutting tube 25 which is positioned axially rearwardly of the apex 23 and has an annular cutting edge 25c and a conically tapered surface 25a engages the soil aft of the apex end and proximate the soil aeration tine 15 to cut a plug of the soil free of the soil. Thus the fracturing of the soil occurs in the soil around the lower portion of the hole and both fracturing and soil removal occurs in the soil zone proximate the cutting tube which results in a soil aeration pocket in the soil where the soil aeration pocket is larger than the soil plug cut free of the soil and also without the soil compaction that would occur if a spike were driven downward into the soil.

Figure 3B:
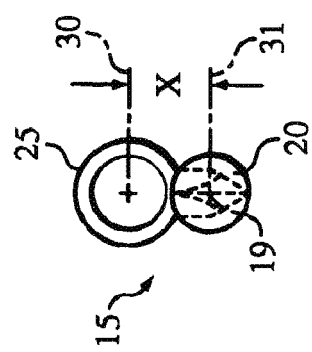
FIG. 3b is a back view of the aeration tine of FIG. 2.
Figure 3:
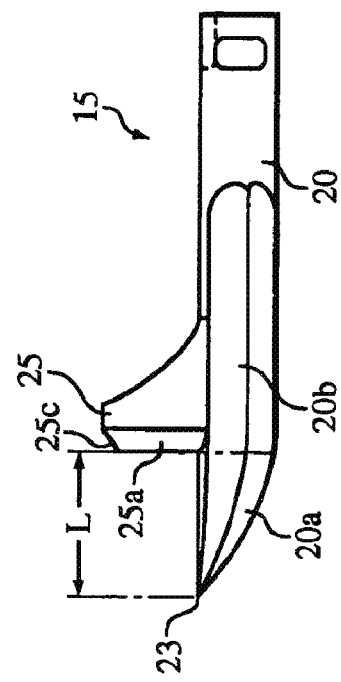
FIG. 3 is a side view of the aeration tine of FIG. 2.
Figure 3A:
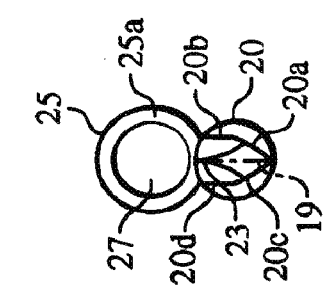
FIG. 3a is a front view of the aeration tine of FIG. 2.

FIG. 3 shows a side view of soil aeration tine 20 illustrating a portion of a divergent soil fracturing section 22 which includes an upwardly curving soil fracturing face 20a and an upwardly curving soil fracturing face 20b that terminates at apex end 23. FIG. 3a shows the opposite side of soil aeration tine 15 illustrating the other side of the divergent soil fracturing section 22 which includes identical upwardly curving soil fracturing faces 20c and 20d that terminates at apex end 23. A soil lifting face 24 extends laterally from side-to side of soil aeration tine 15. The soil lifting face 24 forms a scoop or spade so that when the soil aeration tine is rotationally removed from the soil the soil face 24 can lift or scoop soil from the soil aeration pocket.

The soil cutting tube 25 has a leading and annular cutting edge 25c that diverges outwardly along annular face 25a to the cylindrical shaped soil cutting tube 25. The cutting edge 25c of cutting tube 25 is positioned a distance L rearward of the apex end 23 of soil aeration tine 15 to enable the soil fracturing section 22 to penetrate and fracture the soil before the soil aeration tube cuts a soil plug free of the soil. In the embodiment shown the soil cutting tube is positioned at least one and one half inches rearward of the apex end to ensure that the length of the soil plug is kept to a minimum. On the other hand the soil cutting tube should extend sufficiently far along elongated member 20 so as to ensure that one can cut through the top layer of grass and soil. Thus, in the embodiment shown in the drawings the end of the tine 15 lacks an end coring device.

FIG. 3b shows a back view of soil aeration tine 15 with a first line 31 extending outward from the central axis 19 of elongated member 20 and a second line 30 extending outward from the geometric center of cutting tube 25 with the distance between the centers indicated by the dimension x. That is, FIG. 3b illustrates that the cutting tube is laterally offset from the elongated member 20 so that cutting tube 20 and elongated member 20 enter the soil in a side by side condition.

Figure 4:
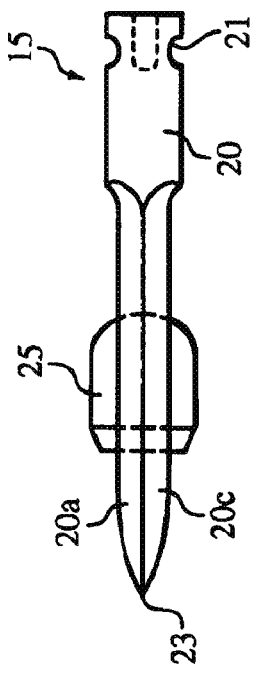
FIG. 4 is a bottom view of the aeration tine of FIG. 2.

FIG. 4 is a bottom view of soil aeration tine 15 illustrating that the soil fracturing faces 20a and 20c extend axially along elongated member 20 and terminate at apex end 23. Thus the under side of aeration tine 15 presents soil fracturing surfaces 20a and 20c while the top side of soil aeration tine 15 presents the latterly offset and rearwardly positioned cutting tube 25 for cutting the soil to remove a plug of soil and grass.

Figure 5:
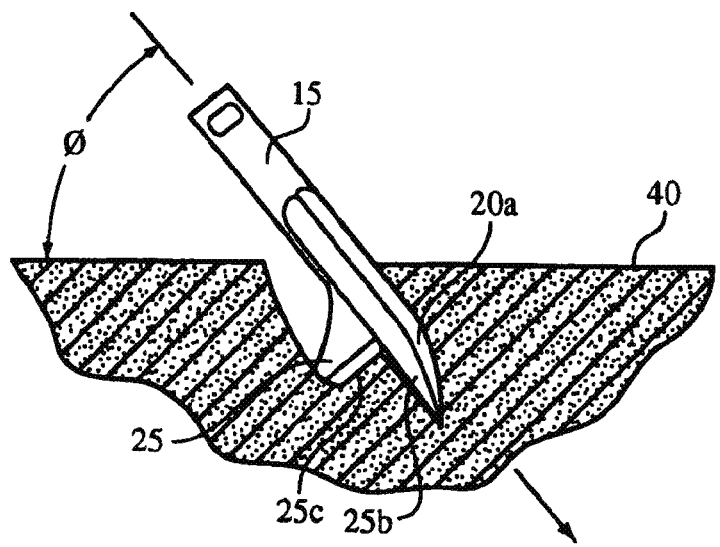
FIG. 5 is a partial side view showing the aeration tine of FIG. 2 penetrating the soil.

FIG. 5 is a partial schematic illustrating how soil aeration tine 15 penetrates a patch of soil 40 at an acute angle φ with respect to the top soil. In the first step the soil aeration soil fracturing surfaces 20a, 20b on one side of elongated member 20 and the soil fracturing surfaces 20c and 20d located on the opposite side of the elongated member penetrate the soil with the soil fracturing surfaces entering the soil at an acute angle causing the soil 15 proximate the soil aeration tine 15 to fracture upward rather than compact. That is the acute angle penetration of the soil fracturing surfaces with the fracturing surfaces facing upward produces an upward component that forces the soil upward. As the soil can fracture and move upward the resistance to soil compaction above the soil aeration tine 15 is less than the resistance to soil compaction in the lateral direction. That is, lateral displacing soil produces increased soil compaction since the soil must compact against itself. Thus avoiding direct lateral compaction inhibits soil compaction. At the same time the soil fracturing faces fracture the portion of the soil located ahead of the soil aeration tine the cutting edge 25c, which trails the apex end 23, cuts a soil plug free of the soil. In the embodiment shown the cutting edge 25c extends substantially perpendicular to soil aeration tine 15 to enable the soil aeration tube 25 to capture a soil plug aft of the apex end 23 as the soil aeration tine 15 is driven axially into the soil. It should be pointed out that although multiple soil fracturing faces are shown it is envisioned that only a single soil fracturing surface could be used.

Figure 6:
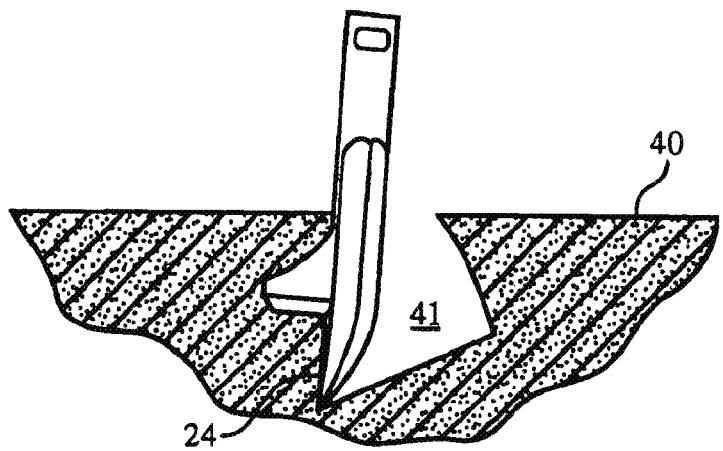
FIG. 6 is a partial side view showing the aeration tine of FIG. 2 partially rotated within the soil.

FIG. 6 illustrates the step when the soil aeration tine is rotated in a clockwise direction as the tine is being moved forward. This rotational action results in an aeration pocket 41 being formed in the region first penetrated by the soil aeration tine.

Figure 7:
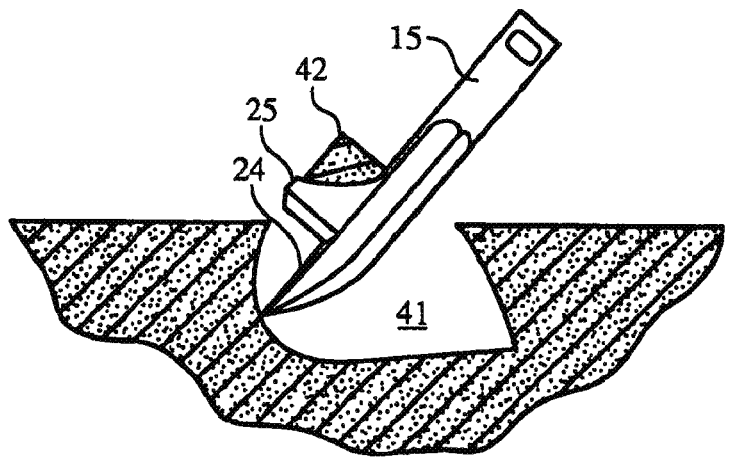
FIG. 7 is a partial side view showing the aeration tine of FIG. 2 emerging from the soil.
Figure 9:
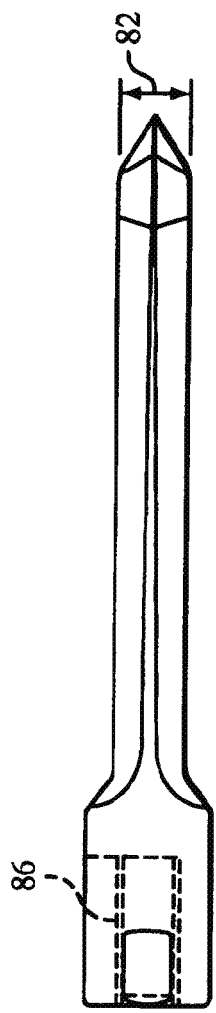
FIG. 9 is a top view of the aeration tine of FIG. 8.
Figure 11:
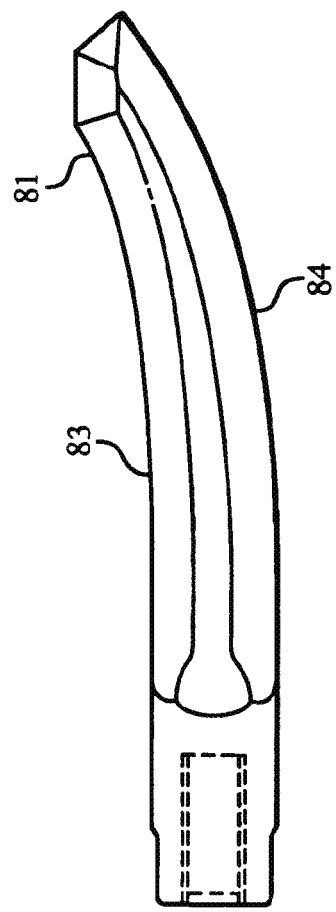
FIG. 11 is a side view of the aeration tine of FIG. 8.
Figure 8:
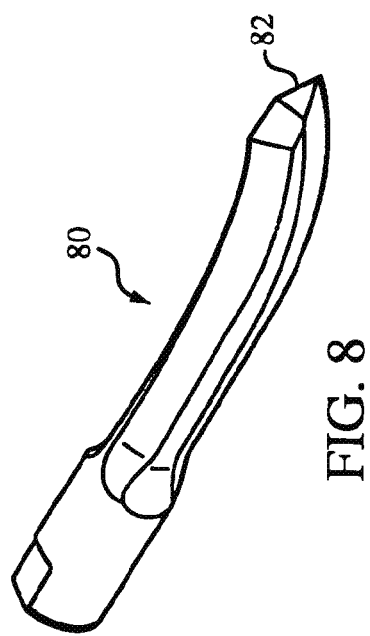
FIG. 8 is a perspective view of an alternate aeration tine.
Figure 10:
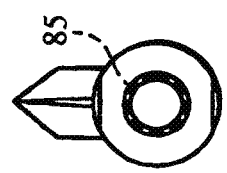
FIG. 10 is an end view of the aeration tine of FIG. 8.

FIG. 7 illustrates the further enlargement of the soil aeration pocket 41 as the soil aeration tine 15 continues in a compound motion as a result of the planetary action that drives the tine rearward during the rotation of the support mechanism and forward due to the pulling of the soil aeration device and the rotation of the aeration tine. As a result, the compound rotation causes the soil aeration tine top face 24 to lift or scoop soil from the aeration pocket while a cut soil plug 42 is held in cutting tube 25 to be disposed of on the ground when the soil aeration tube 15 exits the soil. The result is that one can form a soil aeration pocket 41 with a minimum of soil compaction and a minimum of displaced soil as the soil aeration tine with the aft cutting tube removes a soil plug of substantially smaller volume than a soil aeration tube located on an apex end of a soil aeration tube. Consequently, less soil is left on top of the soil since the soil plugs formed by the present method are smaller than soil plugs formed by the end core method. Yet at the same time the aeration holes 41 formed in the soil are as large or larger than holes formed by a conventional cylindrical cutting tubes.

Thus the method of making a soil aeration hole 41 comprises the step of extending an elongated member 20 having a lateral face 24 on one side and a soil diverging section formed by faces 20a and 20c on the other side into the soil to fracture the soil proximate the diverging faces. In addition, one cuts a soil plug free of the soil with the soil aeration tube 25 by cutting the soil plug from the soil located rearward and lateral of the diverging faces 20 and 20c. By rotationally removing the elongated member 20 one can free the soil plug and form a soil aeration hole 41 having a top opening smaller than a bottom opening as shown in FIG. 7. Also by rotationally removing the elongated member 20 with the apex end 23 and lifting surface 24 one can partially scoop out soil with the soil lifting face 24 on the elongated member.

In the embodiments shown the soil cutting tube 25 has an external diameter larger than the external diameter of the aerator tine. Although, it is submitted that the diameter of the soil cutting tube 25 can be governed by other factors such as soil types and soil conditions.

Thus the soil aerator tine 15 can include at least one soil fracturing face in a diverging section 22 which diverges in a direction rearward from an apex end 23 on soil aerator tine 15 and in a direction away from a lifting face 24 on soil aerator tine 15. The soil aeration device 15 illustrated in FIG. 3a shows two soil fracturing faces 20a and 20c symmetrically positioned around a central axis 19 extending through the soil aeration tine elongated member 20. A review of FIG. 3a shows that apex end 23 on soil aeration tube 22 is located lateral of the central axis 19 extending through the soil aeration tube 15. By having the soil diverging faces forming an off center apex 23 on one side of the soil aeration tine 15 the soil against the soil face 24 is penetrated without compaction while the soil above the soil aeration fracture faces is forced away from the soil aeration tube. When the soil aeration tube is driven at an acute angle into the soil the diverging fracturing surfaces move the soil upward which fractures the soil without compacting the soil.

FIGS. 8-11 depict an aeration blade 80 adapted for use in connection with the above-described aeration device 10. The blade 80 functions similarly to the aeration tine 15 discussed above, except that it does not cut and remove a plug of soil. The arcuate tine 80 penetrates the soil as shown and described in connection with FIGS. 5-7, but because this blade lacks the soil cutting tube 25, no plug is removed from the soil and deposited on the surface of the aerated turf. Rather, as the aeration tine 80 pivots in the motion shown in FIGS. 5-7, the arcuate end 81 of the aeration tine 80 cuts an aeration groove having a longer dimension in the direction of the cut, which provides a degree of aeration comparable to that provided by aeration tine 15.

Figure 20:
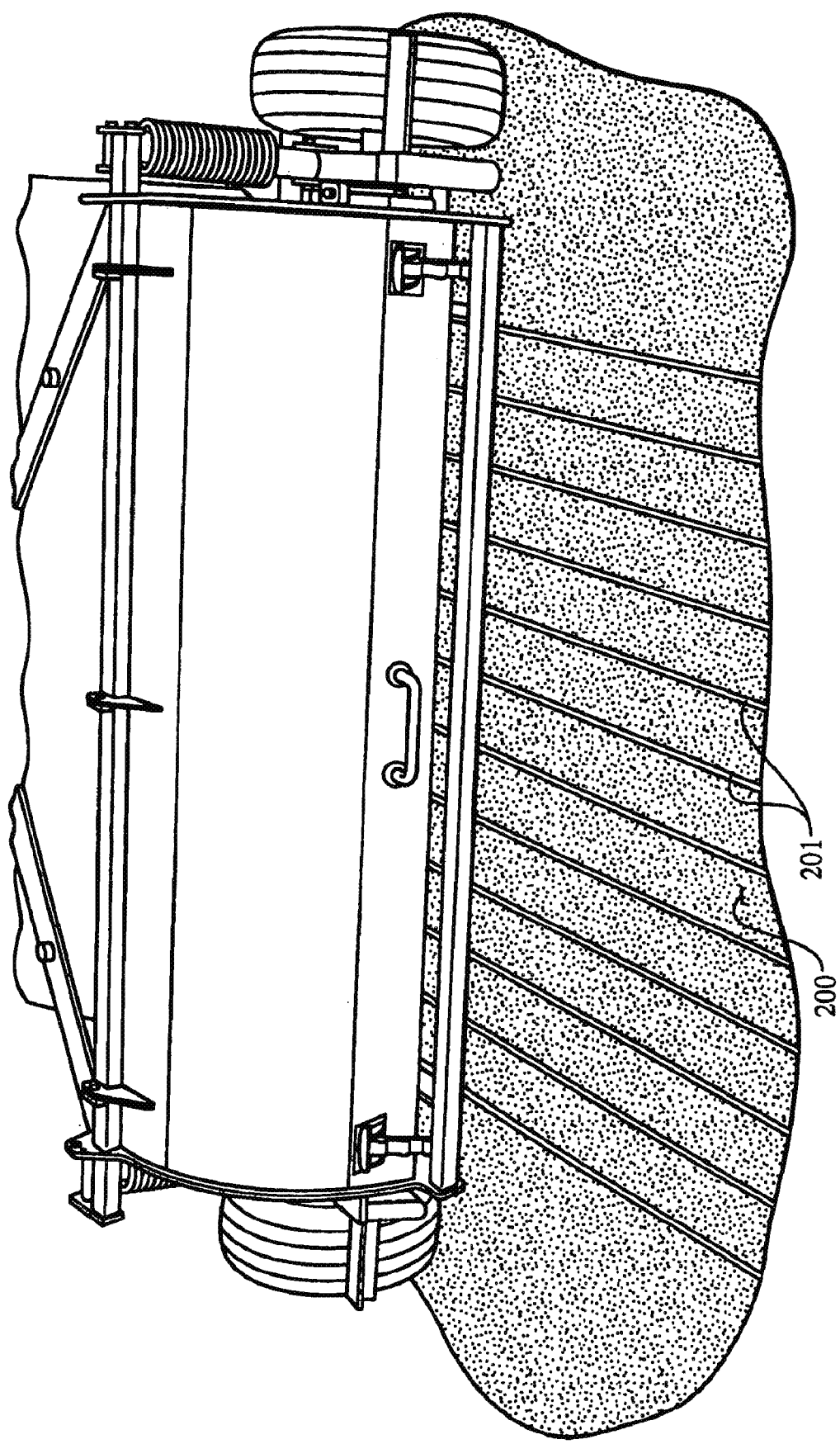
FIG. 20 depicts a golf course green that has been aerated with the aeration tine of FIG. 16.

Moreover, turf aerated with tine 80 will not be littered with aeration plugs. As shown in FIG. 20, the surface 200 of the aerated turf remains substantially uniform. The aeration pockets 201 are visible, but no significant amount of soil has been deposited on the grass surface 200. Accordingly, the turf need not be further treated (as by mowing) before receiving approach shots or serving as a putting surface. The aeration tine 80 can thus be advantageously implemented to significantly reduce maintenance expenditures and virtually eliminate course downtime caused by aeration procedures.

Returning to FIGS. 8-11, the aeration blade 80 has a tip 82, concave edge 83, and convex edge 84. The cavity 85 is adapted to be received onto a mounting element (not shown) protruding from tine holders 14 of the soil aeration device 10. The blade 80 may be made of high strength steel, metal alloys, composites, hard polymeric materials, or other suitable materials. The cavity 85 may include threads, keys, detents, cross-drilled tapped holes for set screws, or other suitable structure that cooperates with the mounting elements on tine holders 14 to securely and releaseably hold blades 80. Releaseable mounting configurations advantageously facilitate removal of blades 80 for sharpening or replacement. The aeration tine 80 of FIGS. 8-11 has a width 82 of approximately 7/16".

The aeration tines of FIGS. 12-15 are similar to the tine of FIGS. 8-11, except that the tine of FIGS. 12-15 has a width 122 of approximately 5/16". The tine of FIGS. 16-19 has a width 162 of approximately 1/8" and is adapted for aeration of surfaces which must remain particular flat and even after aeration, such as putting greens.

Figure 21:
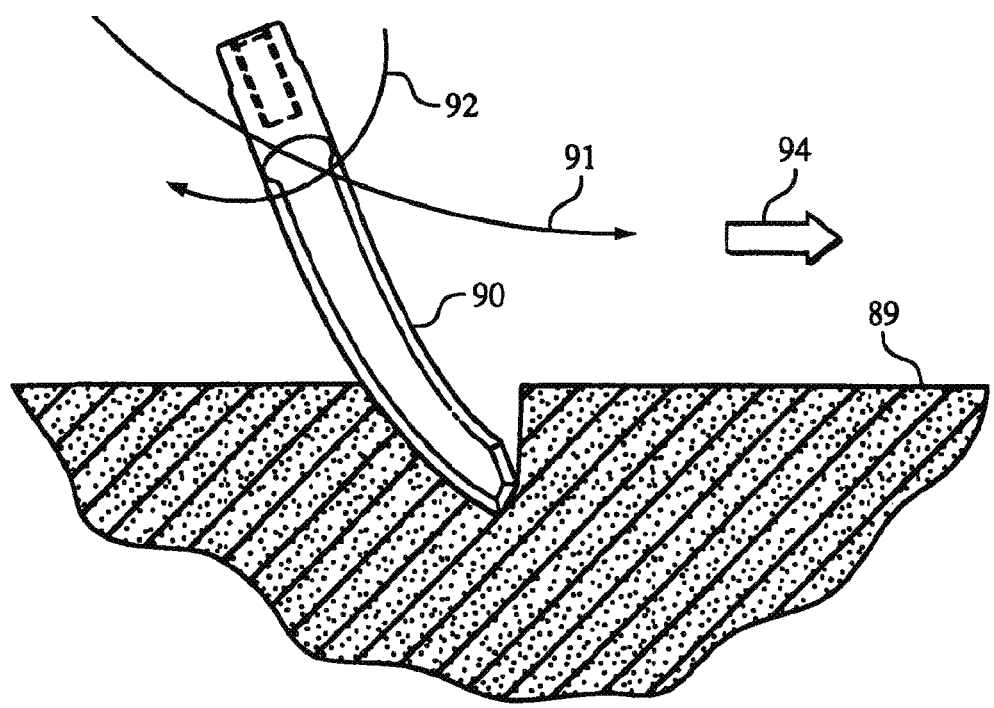
FIGS. 21-24 depict the planetary motion of arcuate tines in certain embodiments.

The operation of the arcuate aeration blades are shown in more detail in FIGS. 21-24. With reference to FIG. 21, an arcuate aeration blade 90 penetrates soil 89 in a downward, clockwise motion 92. As the tractor proceeds in the direction shown by arrow 94, the planet gear (not shown) that drives the blade 90 rotates in clockwise direction (as shown by arrow 92) while being driven in a counterclockwise planetary direction (as indicated by arrow 91). As the tractor continues in the direction of arrow 94, the blade 90 translates in the direction of arrow 91 while continuing to rotate in the direction indicted by arrow 92, thus carving an aeration pocket and causing soil fractures 93. Optionally, the blade 90 can be mounted in the opposite direction, such that its longer blade edge end faces in direction 94. Such an arrangement can be usefully employed to, for instance, lift soil from the aeration pocket, thereby increasing the pocket's size.

Figure 22:
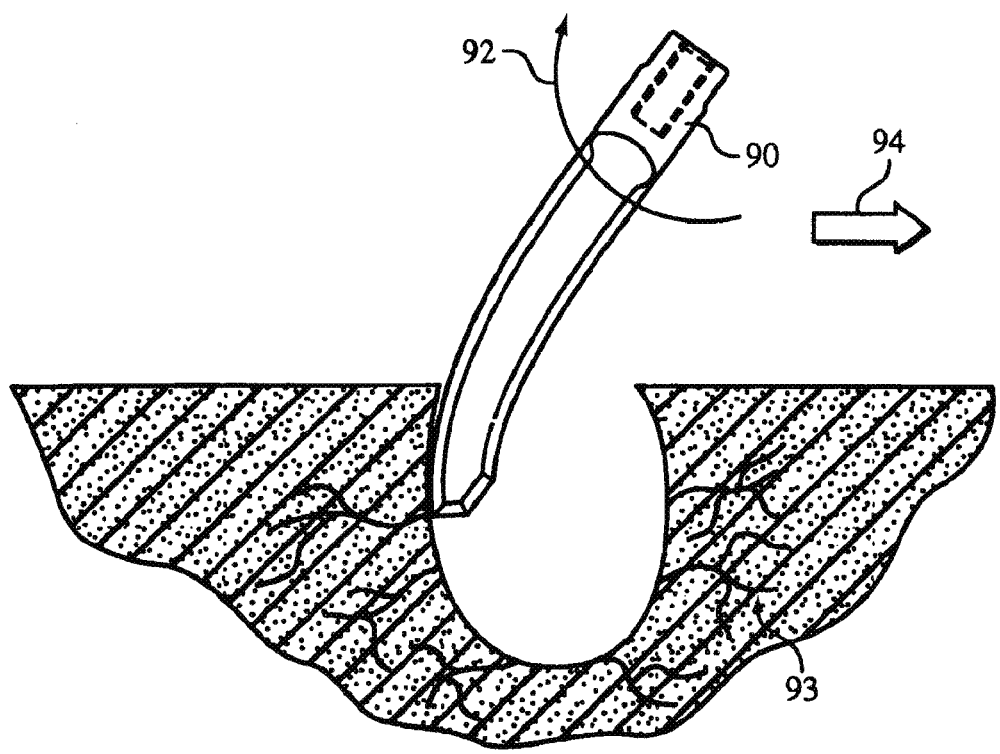
Figure 23:
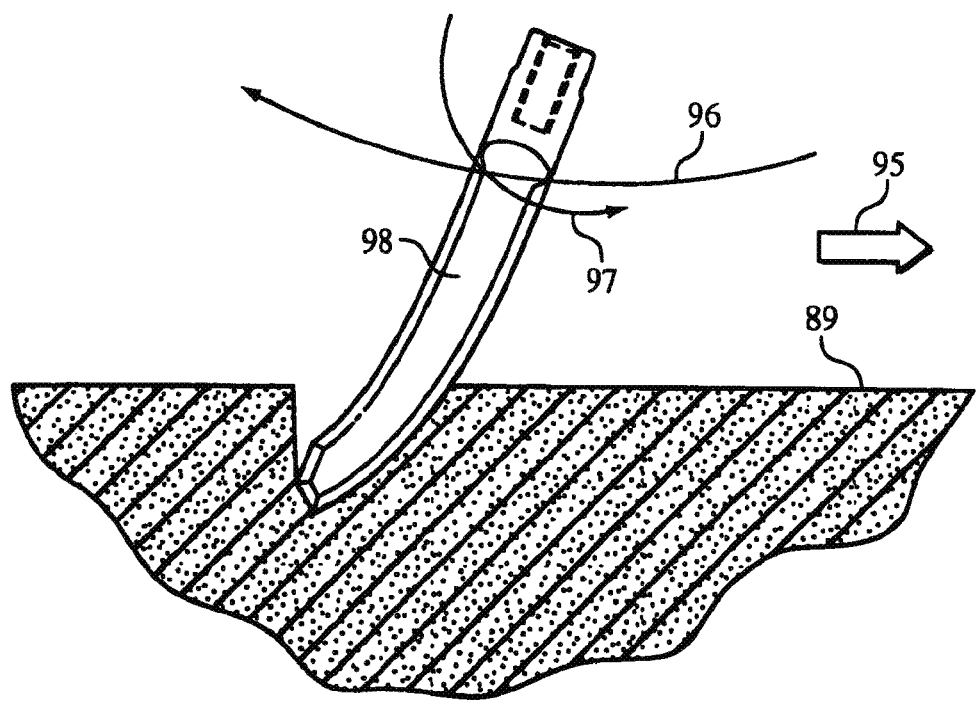
Figure 24:
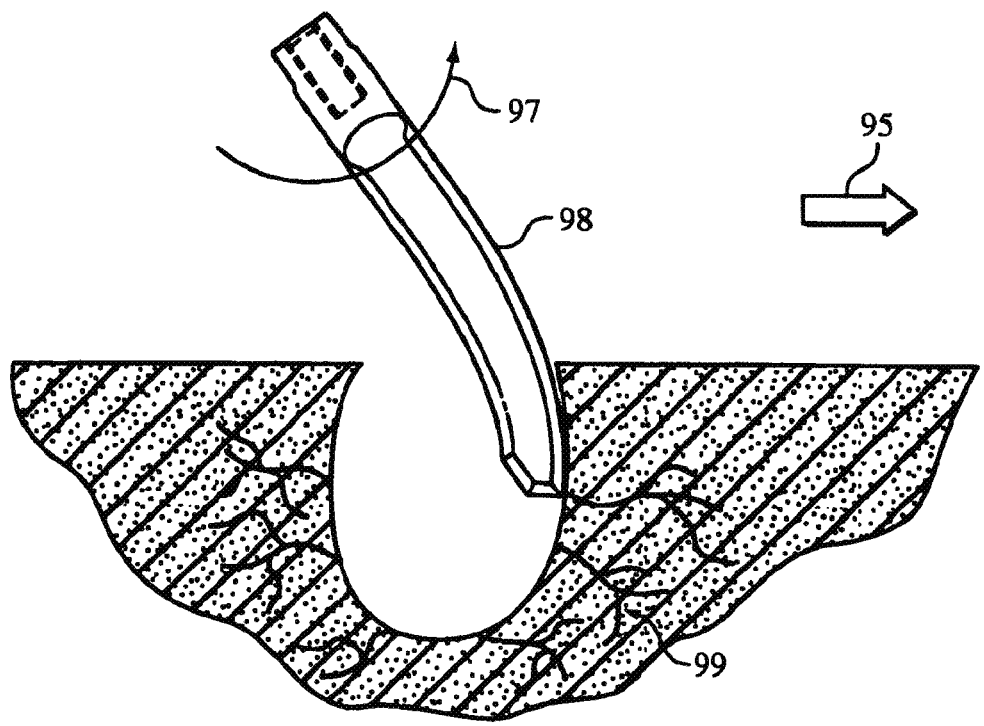

FIGS. 23-24 depict an embodiment in which the planetary motion is reversed relative to that shown in FIGS. 21-22. The blade 98 plunges downward into the soil 89 as it translates in the direction of arrow 96 and rotates in a counter-clockwise direction, as indicated by arrow 97. As the tractor proceeds in the direction of arrow 95, the blade 98 continues to translate and rotate in the aforementioned directions, thereby forming a pocket and soil fractures 99.

Figure 25:
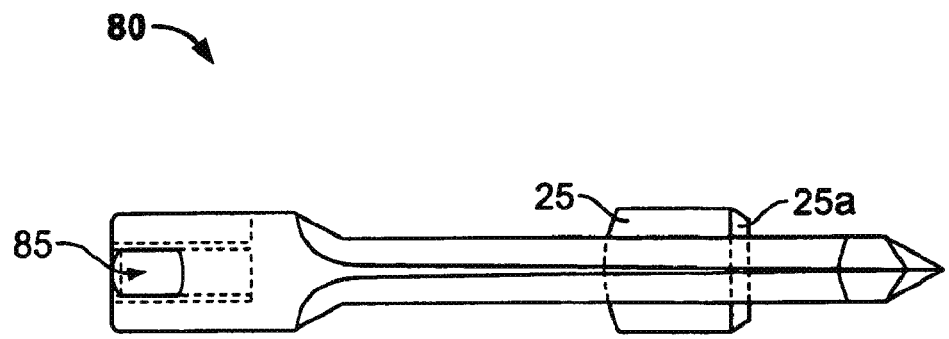
FIGS. 25-26 depict a top view and a side view, respectively, of another embodiment of an aeration tine.
Figure 26:
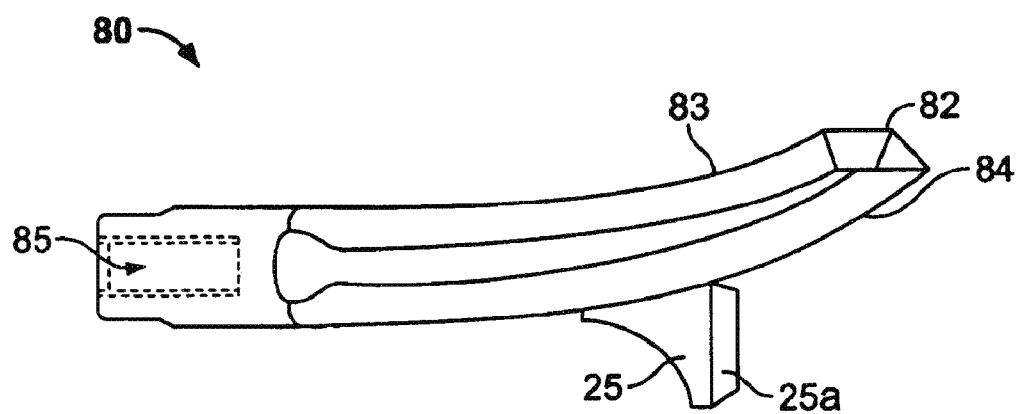

The blade 80 can be equipped with an aeration tube 25 on its trailing or leading edges, as shown in FIGS. 25-26. In such embodiments, the arcuate blade serves to fracture the soil which is compacted by the soil aeration tube 25.

Figure 27:
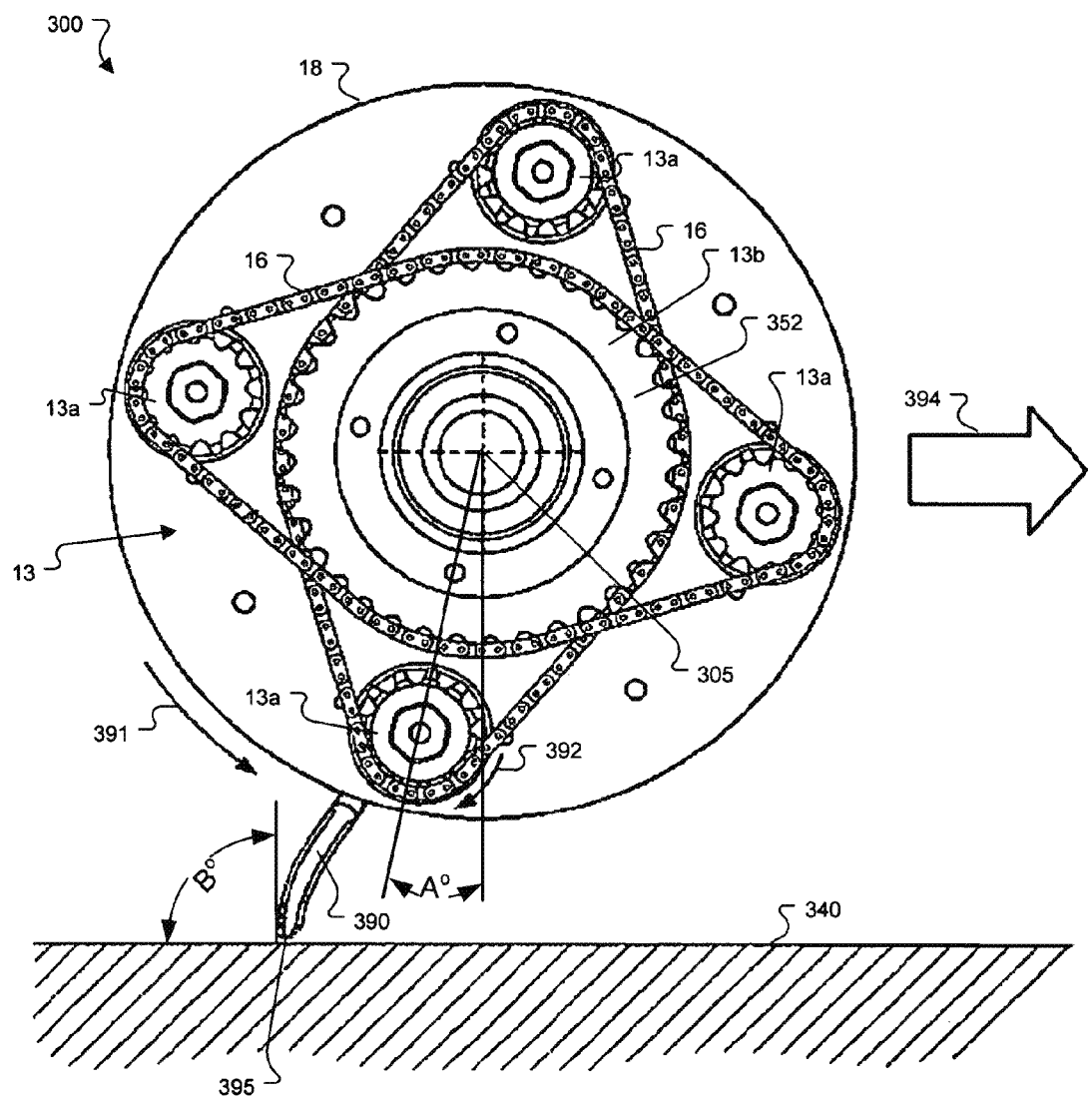
FIG. 27 is a side view of a portion of an aeration device in accordance with some embodiments.

Referring to FIG. 27, a soil aeration device 300 may operate to orient an arcuate aeration tine 390 (similar to the tine 90 described in connection with FIGS. 21-24) so that a tip portion 395 penetrates the ground surface 340 in a substantially vertical direction. In these embodiments, such orientation of the arcuate aeration tine 390 may reduce the stress and fatigue on components of the gear system 13, such as the gears 13a and 13b and coupling members (e.g., chain members) described in connection with FIG. 1.

Similar to the embodiments previously described in connection with FIGS. 1 and 21-24, the arcuate aeration tine 390 in the current embodiment is removably mounted to tine holders 14 and rotate in an epicycle or planetary motion (for purposes of clarity only one tine 390 is shown in FIG. 27). For example, in this embodiment, the power take off shaft of a tractor drives the carrier 18 to rotate in a counter-clockwise direction about the central axis 305 (while the sun gear 13b remains substantially stationary relative to the central axis 305), thereby causing the planet gears 13a to revolve 391 about the central axis 305. In response to the revolving motion 391, the sun gear 13b compels each of a plurality of planet gears 13a to rotate about its own axis in a clockwise direction 392 due to one or more coupling members 16 (e.g., chain members in this embodiment). The revolving motion 391 and the rotating motion 392 are transmitted to the arcuate aeration tines 390 because each tine rack 14 (refer, for example, to FIG. 1) undergoes the same compound motions 391 and 392 as the corresponding planet gear 13a. By properly timing the revolving motion 391 and the rotational motion 392 of the planet gears 13a the aeration device 300 is capable of positioning the arcuate aeration tines 390 so that the tip portions 395 penetrate the ground surface 340 in a substantially vertical orientation.

Still referring to FIG. 27, in some embodiments, the planet gears 13a are timed such that the arcuate aeration tines 390 initially penetrate the ground surface 340 when the epicycle orientation of the planet gear 13a relative to the central axis 305 is substantially at an acute angle A. Additionally, the tip portion 395 of the arcuate aeration tine 390 may penetrate the ground surface 340 at a substantially vertical angle B (e.g., substantially perpendicular to the ground surface 340). In this embodiment, for example, the tip portion 395 of the arcuate aeration tine 390 may penetrate the ground surface 340 when angle B is approximately 75 degrees to approximately 105 degrees and may be approximately 90 degrees. With angle B set in this range, it should be understood that the curvature of the tine 390 may affect the position of the mounting end of tine 390 (and the tine holder 14 and the planet gear 13a). As such, in these embodiments, the tip portion 395 of the tine 390 may initially penetrate the ground surface when angle A is approximately less than 45 degrees, may be approximately 5 degrees to approximately 40 degrees, and may be approximately 30 degrees. Such orientation of the arcuate aeration tine 390 may cause the tip portion 395 to initially fracture the ground surface in an efficient manner, which may reduce the impact stress upon the gear system 13 (e.g., gears 13a and 13b and coupling members 16).

Figure 28:
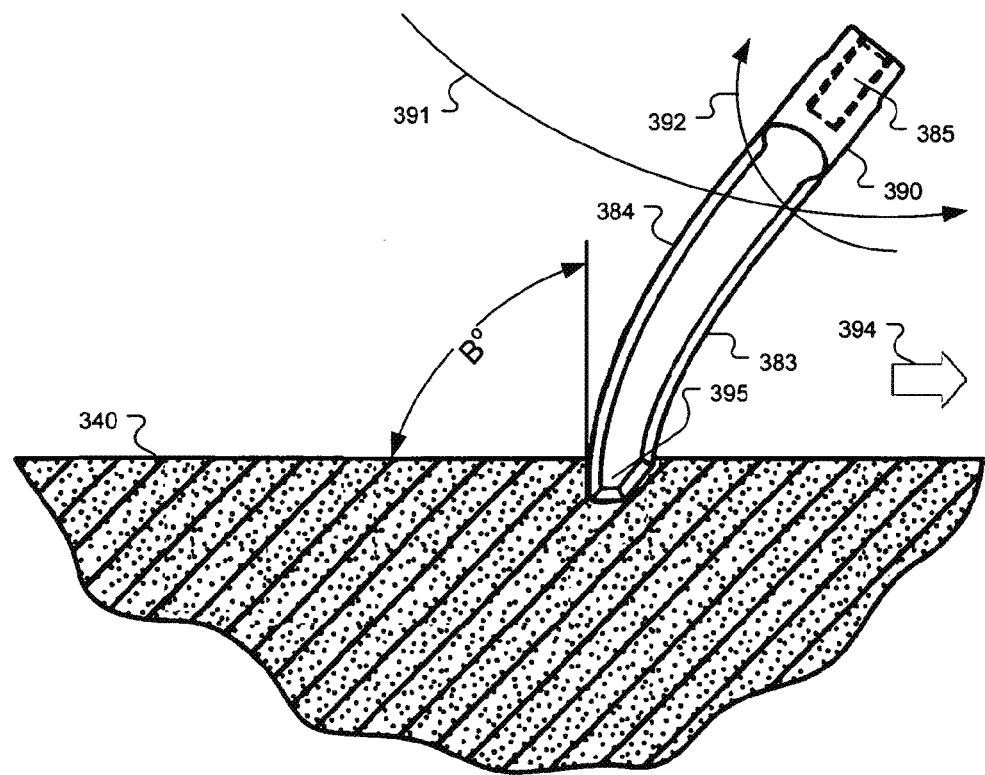
FIGS. 28-29 depict the planetary motion of arcuate tines in certain embodiments.

Referring to FIG. 28, one embodiment of an arcuate aeration tine 390 includes an arcuate blade portion having a concave edge 383 and complimentary convex edge 384 (similar to the concave edge 83 and the convex edge 84 described in connection with FIGS. 8-11). At least one of the concave and convex faces 383 and 384 may be capable of fracturing the soil when the arcuate aeration tine 390 penetrates the ground surface 340. The arcuate aeration tine 390 may include a mounting device, such as a threaded cavity 385 to releasably mount onto a threaded stud (not shown in FIG. 28) on the tine rack 14. In this embodiment, the tractor may pull the aeration device 300 over the ground surface 340 in a substantially horizontal direction 394. As previously described, the revolving motion of the planet gear 13a (FIG. 27) may cause the tine 390 to have a corresponding translational motion 391, and the rotational motion of the planet gear 13a may cause the tine 390 to have a corresponding rotational motion 392. The planetary gear system 13 may be configured to orient the tine 390 so that the tip portion 395 penetrates the ground surface 340 in a substantially vertical direction (as described above). By penetrating the ground surface 340 in this orientation, the impact energy upon the tine 390 (transmitted to the gear system) may be reduced.

Figure 29:
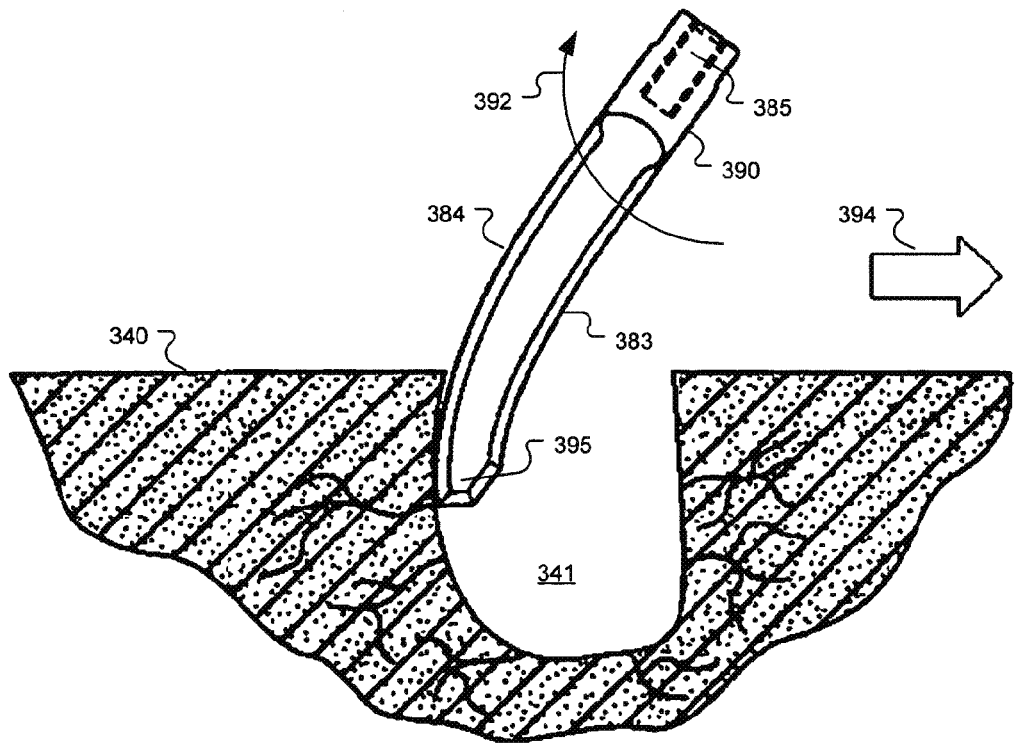

Referring to FIG. 29, the translational and rotational motions 391 and 392 of the tine 390 causes the arcuate aeration tine 390 to form an aeration pocket 341. In this embodiment, the tip portion 395 of the arcuate aeration tine 390 penetrates the ground surface 340 in a substantially vertical direction, which may cause at least a portion of a wall of the aeration pocket 341 to extend in a substantially vertical direction. The convex edge 384 of the tine 390 may sweep through and cut the soil during the rotational motion 392. The translational and rotational motion 391 and 392 may cause the tip portion 395 of tine 390 to exit the ground surface 340 with an orientation that is substantially non-vertical, thereby creating at least a portion of a second wall of the aeration pocket 341 that extends in a substantially non-vertical direction. Thus, in some embodiments, the vertical entry of the tip portion 395 of the tine 390, combined with the rotational motion 392 of the tine 390 and the substantially non-vertical exit of the tip portion 395, may cause the tine 390 to form a non-symmetric aeration pocket 341.

Figure 30:
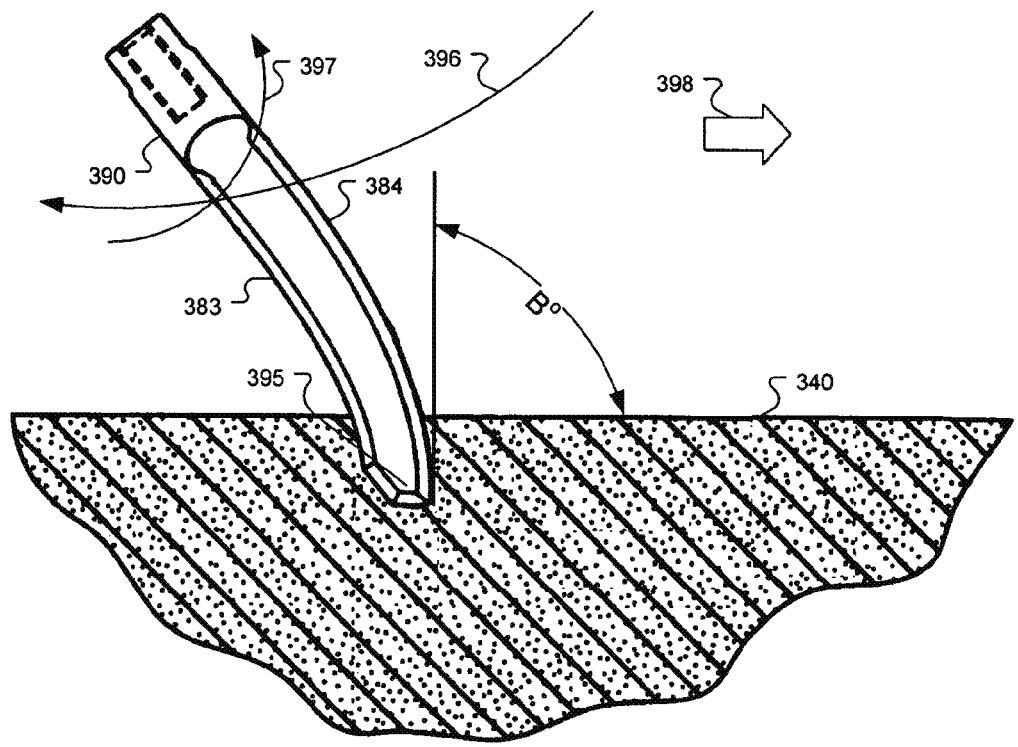
FIGS. 30-31 depict the planetary motion of arcuate tines in some alternative embodiments.
Figure 31:
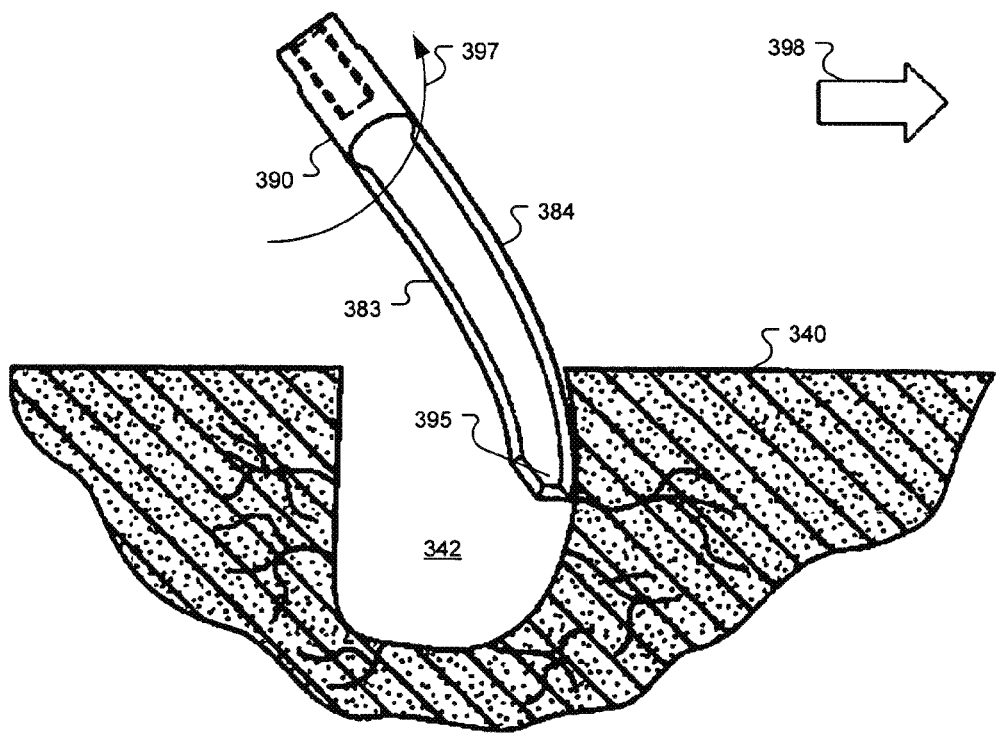

FIGS. 30-31 depict an embodiment in which the epicycle or planetary motion is reversed relative to that shown in FIGS. 27-29. In this embodiment, the tractor pulls the aeration device 300 over the ground surface 340, in a substantially horizontal direction 398. As previously described, the revolving motion of the planet gear 13a may cause the tine 390 to have a corresponding translational motion 396, and the rotational motion of the planet gear 13a may cause the tine 390 to have a corresponding rotational motion 397. The planetary gear system 13 may be configured to orient the tine 390 so that the tip portion 395 penetrates the ground surface 340 in a substantially vertical direction (as described above). For example, when the tine 390 penetrates the ground surface 340, angle B may be approximately 75 degrees to approximately 105 degrees and may be approximately 90 degrees. By penetrating the ground surface 340 in this orientation, the impact energy upon the tine 398 (transmitted to the gear system) may be reduced.

Referring to FIG. 31, the translational and rotational motions 396 and 397 of the tine 390 causes the tine 390 to form an aeration pocket 342. In this embodiment, the tip 395 of the arcuate aeration tine 390 penetrates the ground surface 340 in a substantially vertical direction, which may cause at least a portion of a wall of the aeration pocket 342 to extend in a substantially vertical direction. The convex edge 384 of the tine 390 may sweep through and cut the soil during the rotational motion 397. The translational and rotational motion 396 and 397 may cause the tip portion of the tine 390 to exit the ground surface 340 with an orientation that is substantially non-vertical, thereby creating a second wall of the aeration pocket 341 to extend at least partially in a substantially non-vertical direction. Similar to previously described embodiments, the vertical entry of the tip portion 395 of the tine 390, combined with the rotational motion 397 of the tine 390 and the substantially non-vertical exit of the tip portion 395, may cause the tine 390 to form a non-symmetric aeration pocket 342.

It should be understood that, in some embodiments, the curved tine 390 can be equipped with an aeration tube 25 on its trailing or leading edges (refer, for example, to FIGS. 25-26). In such embodiments, the arcuate portion may fracture the soil which is compacted by the soil aeration tube 25.

Figure 32:
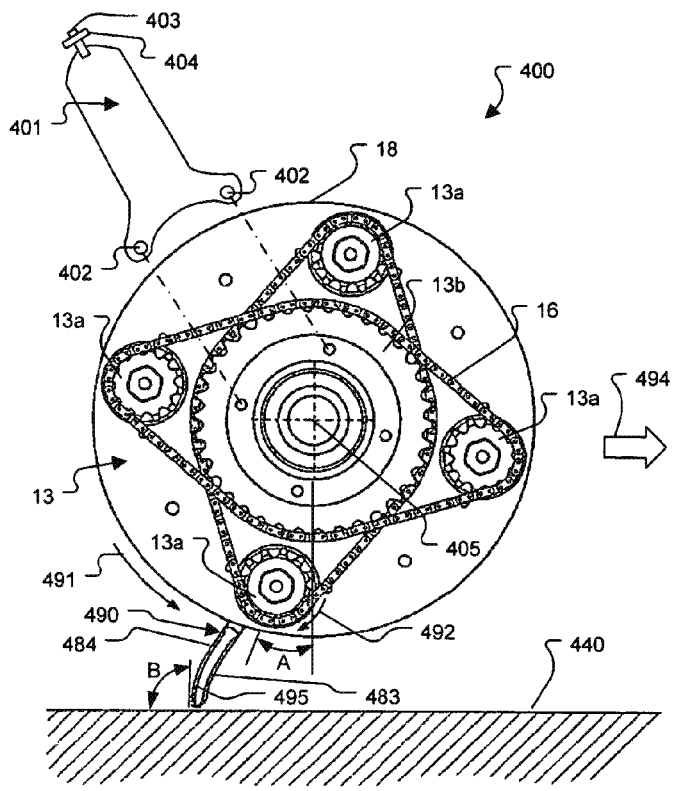
FIGS. 32-33 are side views of a portion of an aeration device in accordance with some embodiments.
Figure 33:
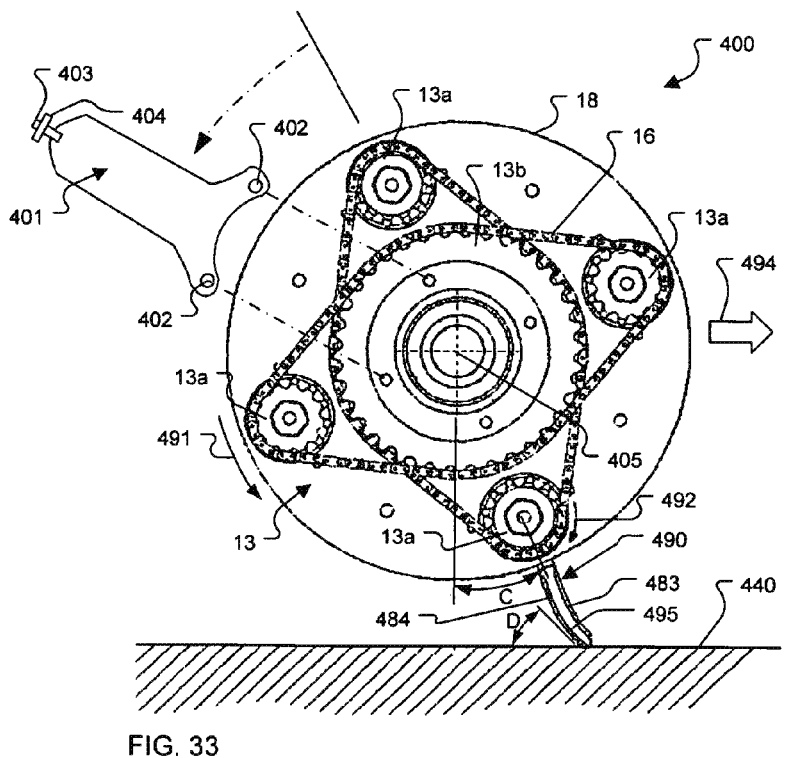

Referring now to FIGS. 32-33, some embodiments of a soil aeration device 400 may be equipped with an adjustable timing device 401 that permits the timing of the gear system 13 to be shifted. In particular embodiments, a user may adjust the timing device 401 from a first position to a second position, which in turn causes the gear system 13 to shift the location and orientation of the aeration tines 490 when initially penetrating the ground surface 440. For example, as shown in FIG. 32, the user may select the position of the timing device 401 so that the gear system 13 causes the tip portion of the aeration tines 490 to penetrate the ground surface 440 in a substantially vertical orientation (previously described in connection with FIG. 27). In another example, as shown in FIG. 33, the user may adjust the position of the timing device 401 so that the gear system 13 causes the tip portion of the aeration tines 490 to penetrate the ground surface 440 in a forward angular orientation.

Similar to the embodiments previously described in connection with FIGS. 1 and 21-24, the arcuate aeration tine 490 in the current embodiment is removably mounted to tine holders 14 and rotate in an epicycle or planetary motion (for purposes of clarity only one tine 490 is shown in FIGS. 32-33)

as a vehicle drives the aeration device 400 over the ground surface 440 in a substantially horizontal, forward direction 494. For example, in this embodiment, the power take off shaft of a tractor drives the carrier 18 to rotate in a counter-clockwise direction about the central axis 405 (while the sun gear 13b remains substantially stationary relative to the central axis 405 during operation), thereby causing the planet gears 13a to revolve 491 about the central axis 405. In response to the revolving motion 491, the sun gear 13b compels each of a plurality of planet gears 13a to rotate about its own axis in a clockwise direction 492 due to one or more coupling members 16 (e.g., chain members in this embodiment). The revolving motion 491 and the rotating motion 492 are transmitted to the arcuate aeration tines 490 because each tine rack 14 (refer, for example, to FIG. 1) undergoes the same compound motions 491 and 492 as the corresponding planet gear 13a. By shifting the angular orientation of the sun gear 13b relative to the central axis 405, timing of the gear system 13 can be adjusted so that the tip portion 495 of the aeration tine 490 penetrates the ground surface 440 in one of a plurality of orientations.

The orientation and location of the aeration tine 490 (as the tip portion 495 penetrates the ground surface 440) may be adjusted depending on the desired size of aeration pocket opening at the ground surface, the extent of aeration necessary for a particular patch of soil, and a number of other factors. For example, as shown in FIG. 32, the user may select the position of the timing device 401 so that the gear system 13 causes the tip portion 495 of the aeration tines 490 to penetrate the ground surface 440 in a substantially vertical orientation (previously described in connection with FIG. 27). This tine penetration position may provide a smaller aeration pocket opening at the ground surface 440, and in some circumstances, may provide less surface disruption. As shown in FIG. 33, the user may adjust the position of the timing device 401 so that the gear system 13 causes the tip portion 495 of the aeration tines 490 to penetrate the ground surface 440 in a forward angular orientation. This forward angular orientation when the tine initially penetrates the ground may provide a longer slice downward at the ground surface 440, thereby producing a large-sized opening at the ground surface 440 or a continuous slit in the surface 440 from the penetration of successive tines 490 (refer, for example, to FIG. 20 for a depiction of such continuous slits). Unlike other machines used to cut continuous slits in the ground, which employ a series of saw blades axially spaced apart on a simple rotating shaft, embodiments of the soil aeration device 400 (depicted in FIG. 33) may cut downward into the soil and do not necessarily scoop soil up from the ground with an upward facing concave blade surface. Rather, embodiments the soil aeration device 400 may form an aeration pocket or slit with the convex edge 484 leading through the soil, and thus the leading convex edge 484 may exit the ground surface 440 at the end of its cutting path (without scooping substantial amounts of soil with a convex blade edge).

Still referring to FIGS. 32-33, the timing device 401 may include a timing arm that is mechanically coupled to the sun gear 13b so as to adjust the angular orientation of the sun gear 13b relative to the central axis 405. For example, the timing device 401 may include one or more mounting holes 402 for receiving screws or other fasteners to mount the timing device 401 to the sun gear 13b. Also, in some embodiments, the timing device 401 may include an adapter portion 403 that is configured to receive a handle, a shaft, a cable, or other mechanism (not shown in FIGS. 32-33) for user control of the timing device 401. As such, a user may grasp or otherwise control a handle, a shaft, a cable, or other mechanism to adjust the timing device 401 from a first position to a second position.

In some embodiments, the timing device 401 may be shifted from the first position to the second position using a key and key slot arrangement. For example, the timing device 401 may include a key member 404 that extends outwardly from the timing device 401 to engage one of a plurality of mating key slots, with each key slot representing one selectable position for the timing device 401. The key slots (not shown in FIGS. 32-33) may be coupled to or integrally formed in the frame of the aeration device 400 (refer, for example, to the frame 11 depicted in FIG. 1). In these circumstances, the timing device 401 may be adjusted from a first position where the key member 403 is fitted into a first key slot to a second position where the key member 403 is fitted into a second key slot. In alternative embodiments, the timing device 401 may be coupled to the actuator shaft of a pneumatic or hydraulic cylinder, servo motor, or another powered device. In such circumstances, a user may control the pneumatic or hydraulic cylinder, servo motor, or another powered device to adjust the position of the timing device 401 while seated in a tractor or utility vehicle.

Referring now to FIG. 32, in some embodiments, the timing device 401 may be positioned so that the tip portion 495 of the aeration tine 490 initially penetrates the ground surface 340 when the epicycle orientation of the planet gear 13a relative to the central axis 305 is substantially at an acute angle A. Additionally, the tip portion 495 of the arcuate aeration tine 490 may penetrate the ground surface 440 at a substantially vertical angle B (e.g., substantially perpendicular to the ground surface 340). For example, as previously described in connection with FIG. 27, the tip portion 495 of the aeration tine 490 may penetrate the ground surface 440 when angle B is approximately 75 degrees to approximately 105 degrees and may be approximately 90 degrees. In these circumstances, the tip portion 395 of the tine 390 may initially penetrate the ground surface when angle A is approximately less than 45 degrees clockwise from the vertical, may be approximately 5 degrees to approximately 40 degrees, and may be approximately 30 degrees.

Referring now to FIG. 33, in some embodiments, the timing device 401 may be shifted to a second position, which shifts the gear system 13 and causes the tip portion 495 of the aeration tines 490 to penetrate the ground surface 440 in a forward angular orientation. In such circumstances, the tip portion 495 of the aeration tine 490 initially penetrates the ground surface 340 when the epicycle orientation of the planet gear 13a relative to the central axis 405 is substantially at an acute angle C. Additionally, the tip portion 495 of the arcuate aeration tine 490 may penetrate the ground surface 440 at a forward angle D. For example, the tip portion 495 of the aeration tine 490 may penetrate the ground surface 440 when angle D is approximately 0 degrees to approximately 70 degrees, depending upon the curvature of the aeration tine 490, the length of the aeration tine, the height of the planetary gear 13a, and other factors. In these circumstances, the tip portion 395 of the tine 390 may initially penetrate the ground surface when angle C is approximately less than 45 degrees counter-clockwise from the vertical, may be approximately 5 degrees to approximately 40 degrees, and may be approximately 30 degrees. Accordingly, some embodiments of the aeration device 400 may comprise a timing device 401 that is capable of shifting the epicycle orientation of the planet gear 13a (relative to the central axis 405) at the point of tine penetration from a first epicycle orientation (e.g., angle A depicted in FIG. 32) to a second epicycle orientation (angle C depicted in FIG. 33). In particular embodiments, the difference from the first epicycle orientation to the second orientation may range from about less than 45 degrees clockwise from the vertical to about less than 45 degrees counter-clockwise clockwise from the vertical, or from about 30 degrees clockwise from the vertical to about 30 degrees counter-clockwise clockwise from the vertical.

Various additional modifications can be advantageously made to the apparatus described above in accordance with the teachings set forth herein. For instance, the edge on the concave side of the aeration blade 80 can be replaced with a blunt surface. As noted above, the aeration blades tines can be oriented as shown in the figures, or they can be rotated 180 degrees about the long axis of the blade. The planetary gear set can be modified to have any desired combination of clockwise and counter-clockwise motions of the planet gear 13a and sun gear 13b so that, for instance, both the translation and rotation of the blade are in a clockwise direction. The gear ratios and sizes can be freely modified to create pockets having different profiles and fractures. The tines can be grouped or staggered on the tine holders in any fashion desired. For example, the tines can be grouped in pairs or triplets along the tine holders. The tines can also be disposed at a angle relative to the vertical plane defined by the pocket shown in FIGS. 21-24 to accomplish a different type of soil fracturing.

A number of embodiments of the invention have been described. Nevertheless, it will be understood that various modifications may be made without departing from the spirit and scope of the invention. Accordingly, other embodiments are within the scope of the following claims.

What is claimed is:

1. A soil aerator, comprising:
  a frame supported by wheels and having a tow vehicle connector so that the frame is configured to be towed in a forward towing travel direction;
  a soil aeration apparatus configured to form a plurality of aeration pockets in a ground surface, comprising:
    a tine holder shaft extending longitudinally along a shaft axis that is offset from a central axis of the soil aeration apparatus, wherein the tow vehicle connector is positioned forward of the central axis of the soil aeration apparatus;
    a gear system that imparts compound motions to the tine holder shaft so that the tine holder shaft revolves about the central axis while rotating about the shaft axis; and
    a plurality of curved tines mounted to the tine holder shaft, each of the curved tines having a concave edge, an oppositely disposed convex edge, generally flat lateral side faces opposing one another, and a tip portion, wherein the compound motions are imparted to the tine holder shaft while the curved tines are in the ground surface to form aeration pockets, wherein the convex edge of each respective curved tine cuts through the soil while the respective curved tine is in the ground surface; and
    wherein the curved tines have a penetration orientation in which the tip portion of each of the curved tines is positioned rearward of the central axis of the soil aeration apparatus when the tip portion approaches the ground surface, and wherein the penetration orientation of the curved tines is adjustable to a different penetration orientation.

2. The soil aerator of claim 1, further comprising a timing member configured to adjust the penetration orientation of the curved tines to the different penetration orientation, the timing member being coupled to the gear system.

3. The soil aerator of claim 2, wherein the timing member is adjustable from a first position to a second position relative to the frame so as to adjust the penetration orientation of the curved tines to the different penetration orientation.

4. The soil aerator of claim 2, wherein the timing member includes an adapter portion that couples with one of a handle, a shaft, and a cable for user control of the timing member.

5. The soil aerator of claim 1, wherein the tip portion of each of the curved tines is oriented in a substantially perpendicular direction relative to the ground surface when the tip portion approaches the ground surface.

6. The soil aerator of claim 1, wherein the tip portion of each of the curved tines is oriented in a substantially non-perpendicular direction relative to the ground surface when the tip portion exits the ground surface.

7. The soil aerator of the claim 1, wherein the compound motions imparted to the tine holder member causes each of the curved tines to form a non-symmetric aeration pocket.

8. The soil aerator of claim 1, wherein the tow vehicle connector of the frame comprises a single-point hitch, and the frame supports the tine holder shaft over the ground surface.

9. The soil aerator of claim 1, wherein each curved tine includes:
  a proximal mounting portion to secure the tine to a tine holder member, the proximal portion being substantially straight; and
  a curved blade portion disposed distally of the proximal portion, the curved blade portion being at least partially defined by the concave edge, the convex edge, and the tip portion so that, as the curved tine is urged in the compound motions through the ground surface, the curved blade portion fractures soil to form an aeration pocket.

10. The soil aerator of claim 1, wherein the gear system imparts compound motions to a plurality of tine holder shafts that extend generally parallel to one another, further comprising multiple curved tines mounted to each of the plurality of the tine holder shafts.

11. The soil aerator of claim 1, wherein the portion of the curved tine that is in the ground surface to form the aeration pocket is defined by a non-tubular cutting blade portion.

12. The soil aerator of claim 1, wherein the convex edge cuts of each curved tine cuts through soil and faces generally away from the forward towing travel direction while the curved tine is in the ground surface.

13. The soil aerator of claim 1, wherein the concave edge of each curved tine faces toward the ground surface when the tine exits the ground surface.

* * * * *